(12) United States Patent
Skarnes et al.

(10) Patent No.: US 10,897,094 B2
(45) Date of Patent: Jan. 19, 2021

(54) CLAMPING DEVICE AND METHOD FOR PROVIDING AN ELECTRICAL CONNECTION BETWEEN A SUBSEA PIPELINE AND AN ELECTRICAL CONDUCTOR

(71) Applicant: NEXANS, Courbevoie (FR)

(72) Inventors: Gunnar Skarnes, Halden (NO); Bent Thomas Denis, Halden (NO)

(73) Assignee: NEXANS, Courbevoie (FR)

( * ) Notice: Subject to any disclaimer, the term of this patent is extended or adjusted under 35 U.S.C. 154(b) by 40 days.

(21) Appl. No.: 16/434,784

(22) Filed: Jun. 7, 2019

(65) Prior Publication Data
US 2020/0006870 A1  Jan. 2, 2020

(30) Foreign Application Priority Data
Jun. 13, 2018  (EP) ..................................... 18305726

(51) Int. Cl.
*H01R 4/48* (2006.01)
*F16L 53/34* (2018.01)
*H01R 4/60* (2006.01)

(52) U.S. Cl.
CPC .............. *H01R 4/489* (2013.01); *F16L 53/34* (2018.01); *H01R 4/60* (2013.01)

(58) Field of Classification Search
CPC ............. F16L 53/34; F16L 53/37; H01R 4/60
(Continued)

(56) References Cited

U.S. PATENT DOCUMENTS 1,809,714 A * 6/1931 Mathews ................ F16L 53/38
219/522
2,855,577 A * 10/1958 Flower ................. H01R 4/4863
439/100
(Continued)

FOREIGN PATENT DOCUMENTS

WO      2010135772      12/2010

OTHER PUBLICATIONS

European Search Report dated Nov. 28, 2018.

*Primary Examiner* — Neil Abrams
(74) *Attorney, Agent, or Firm* — Sofer & Haroun, LLP

(57) ABSTRACT

A clamping device (40) for providing an electrical connection between a subsea pipeline (1) and an electrical conductor (31). The device has a clamp element (41) comprising a first leg (41a) having a first leg end (41c) and a second leg (41b) having a second leg end (41d). The legs (41a, 41b) are configured to be provided on respective sides of the pipeline (1). The clamping device has a releasable tensioning device (48) connected to one of the legs (41a, 41b). The clamping device (40) has a first state, in which the ends (41c, 41d) of the first and second legs (41a, 41b) are provided at a first distance (d1) away from each other. The clamping device (40) has a second state, in which the tensioning device (48) is tensioned, causing the ends (41c, 41d) of the first and second legs (41a, 41b) to be at a second distance (d2) away from each other, the second distance (d2) being larger than the first distance (d1). The clamping device (40) has a template hole (42) provided in one of the legs (41a, 41b). The clamping device (40) comprises a connector member (44) provided in the template hole (42). The connector member (44) is mechanically connected to the clamp element (41). The clamping device (40) has a third state, in which the tensioning device (48) is released, causing the (Continued)

Figure 1:
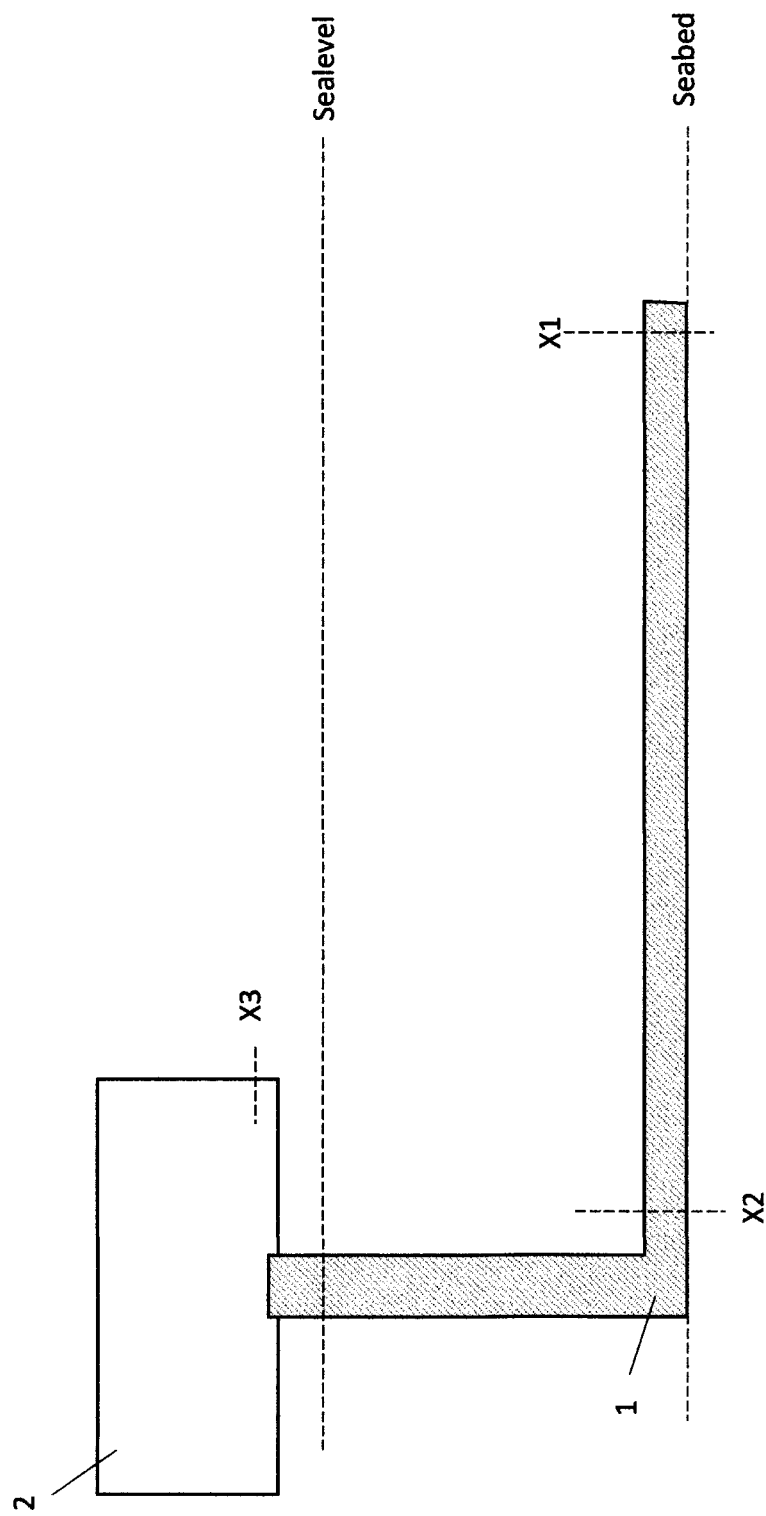

connector member (44) to be pressed towards the pipeline (1).

19 Claims, 5 Drawing Sheets

(58) Field of Classification Search
USPC .............. 439/193, 100, 799; 534/534, 535
See application file for complete search history.

(56) References Cited

U.S. PATENT DOCUMENTS

| | | | | |
|---|---|---|---|---|
| 4,032,205 A * | 6/1977 | Taj | ........................ | H02G 15/068 |
| | | | | 439/208 |
| 4,205,888 A * | 6/1980 | Wade | ..................... | H01R 4/646 |
| | | | | 174/78 |
| 5,616,036 A * | 4/1997 | Polidori | ................... | H01R 4/60 |
| | | | | 248/74.1 |
| 6,059,319 A * | 5/2000 | Wyke | .................... | B29C 65/344 |
| | | | | 219/535 |
| 6,202,300 B1 * | 3/2001 | Yuzwalk | ................ | H01R 4/643 |
| | | | | 29/857 |
| 6,619,972 B2 * | 9/2003 | Boeve | ....................... | H01R 4/64 |
| | | | | 439/100 |
| 7,211,732 B2 * | 5/2007 | Yagi | .................... | H01R 13/5205 |
| | | | | 174/74 R |
| 8,291,939 B2 * | 10/2012 | Ferrone | .................. | H01R 43/00 |
| | | | | 138/33 |
| 9,960,541 B2 * | 5/2018 | Atkinson | ............. | H01R 4/4881 |
| 10,077,861 B2 * | 9/2018 | Heggdal | .................. | H05B 6/101 |
| 10,180,200 B2 * | 1/2019 | Hoyvik | ..................... | F16L 1/16 |
| 10,190,715 B2 * | 1/2019 | Okazaki | ................. | F02M 31/135 |
| 10,247,345 B2 * | 4/2019 | McCann | ................ | H05B 6/101 |
| 2013/0341320 A1 * | 12/2013 | Tailor | ...................... | F16L 53/34 |
| | | | | 219/643 |
| 2016/0365675 A1 | 12/2016 | Atkinson et al. | | |
| 2018/0066770 A1 | 3/2018 | Hoyvik | | |
| 2020/0006870 A1 * | 1/2020 | Skarnes | ................ | H01R 4/489 |

* cited by examiner

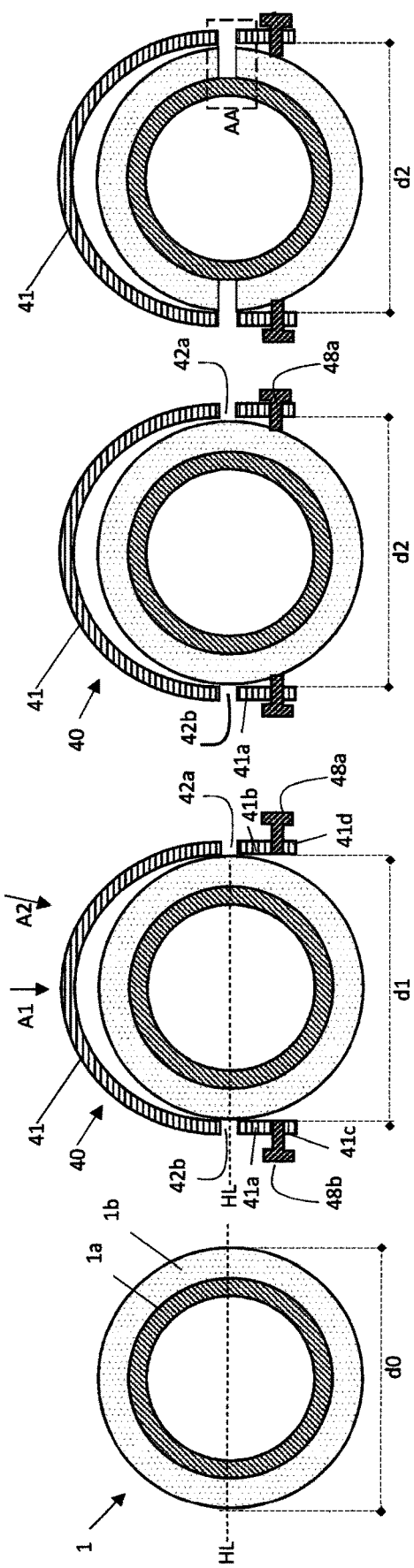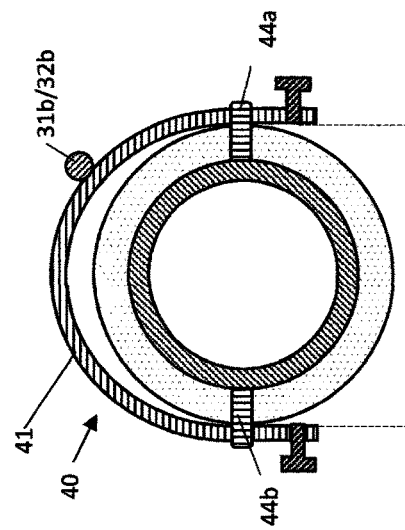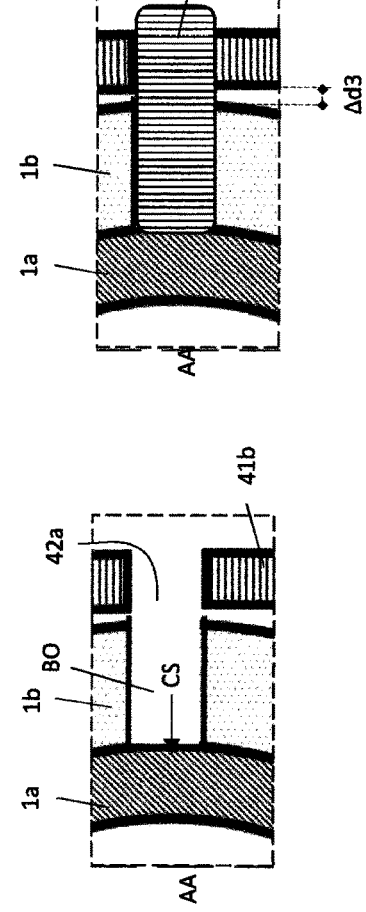

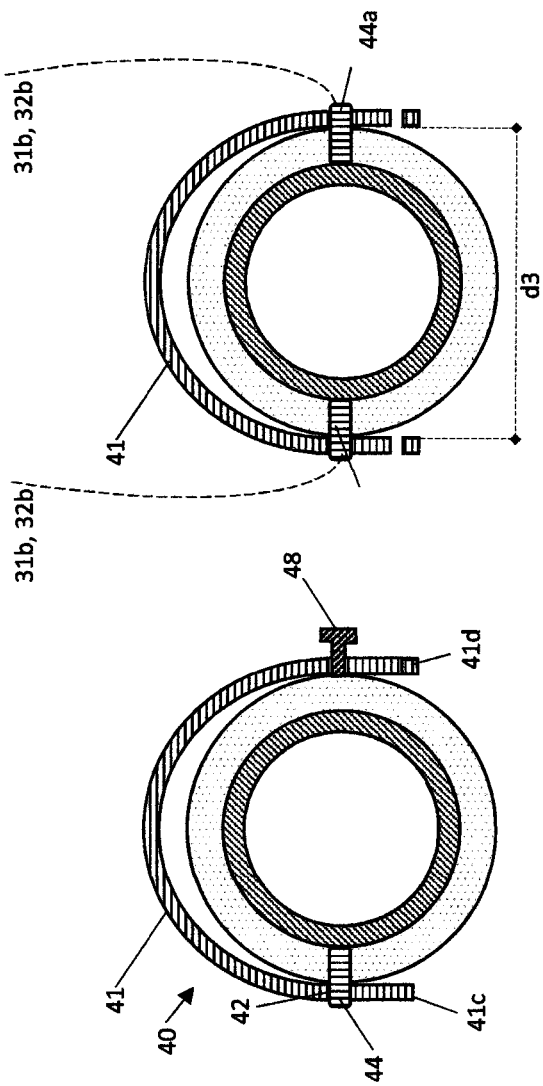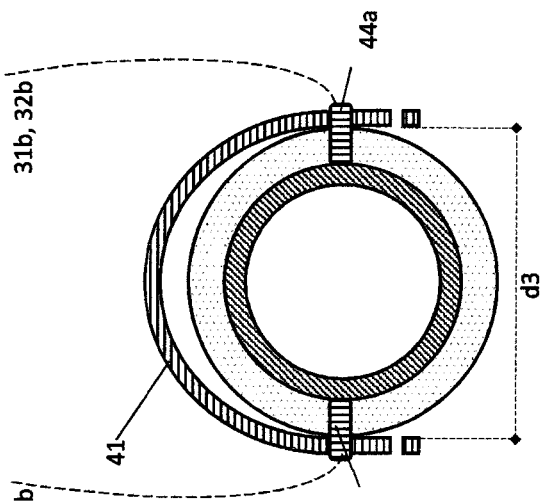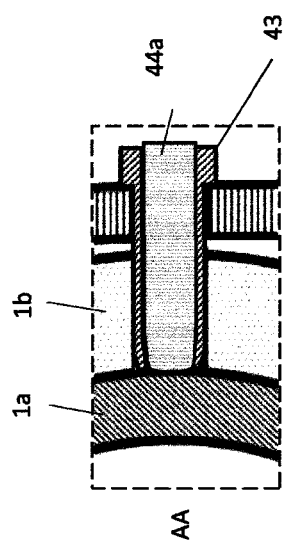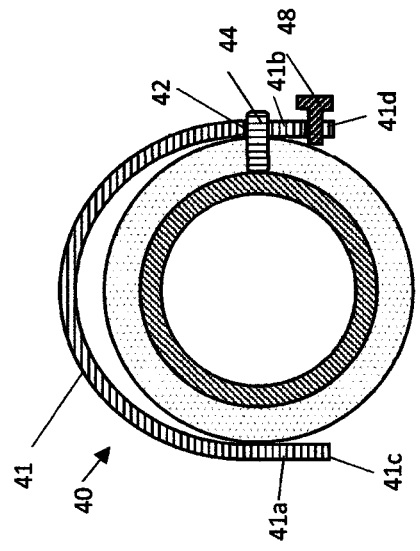

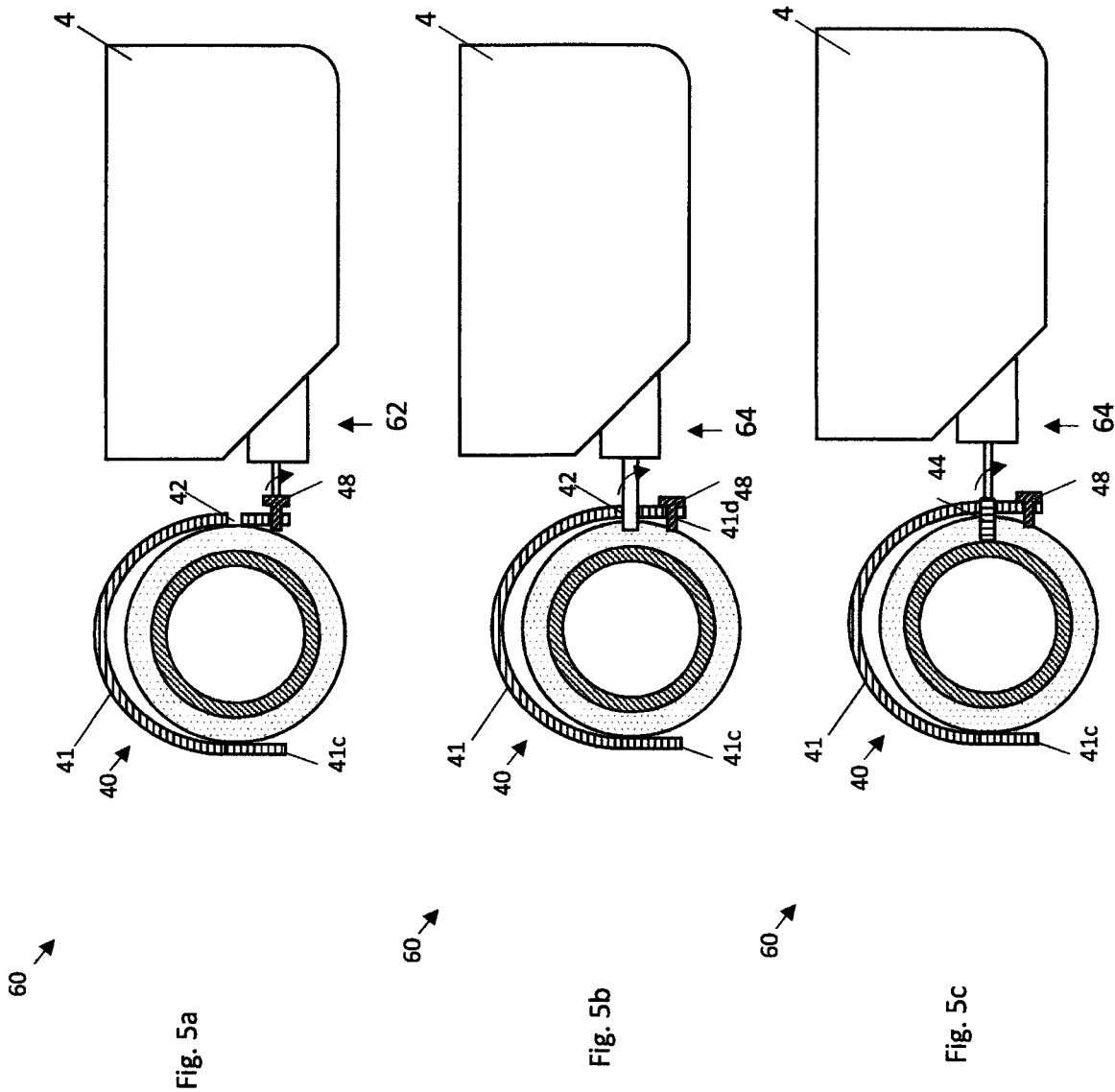

CLAMPING DEVICE AND METHOD FOR PROVIDING AN ELECTRICAL CONNECTION BETWEEN A SUBSEA PIPELINE AND AN ELECTRICAL CONDUCTOR

RELATED APPLICATION

This application claims the benefit of priority from European Patent Application No. 18 305 726.4, filed on Jun. 13, 2018, the entirety of which is incorporated by reference.

FIELD OF THE INVENTION

The present invention relates to a clamping device for providing an electrical connection between a subsea pipeline and an electrical conductor. The present invention also relates to a system for providing an electrical connection between a subsea pipeline and an electrical conductor. The present invention also relates to a method for providing an electrical connection between a subsea pipeline and an electrical conductor. In particular, the present invention relates to a device and method for providing an electrical connection between a subsea pipeline and an electrical conductor of a DEH system retrofitted to the pipeline.

BACKGROUND OF THE INVENTION

A direct electrical heating (DEH) system is arranged for heating of subsea oil or gas pipelines in order to prevent hydrate and ice formation on the pipeline walls. The pipe is heated by running alternating current (AC) through the steel in the pipe. By use of electrical current, the pipeline is heated to stay above critical temperature in the event of production shut down, low production rates or inadequate temperature in the pipeline. The DEH can be turned on when required.

In order to supply current to such a heating system the common practice is to install power supply cable that is connected to a supply cable as a so called "piggyback" cable. This piggyback cable is traditionally laid simultaneously with the laying of the pipeline. More specifically such a cable is strapped to the pipeline during installation thereof. The DEH piggyback cable conducts current from the platform end of the pipeline to the well (far end). At the well, the piggyback cable is connected to the pipeline and the current returns to the platform end trough the steel in the pipeline in parallel with the sea water. The piggyback cable is commonly placed as close to the thermally insulated pipeline as possible, as this yields optimum DEH system efficiency.

In some cases, it is necessary to install a retrofit DEH system onto an existing subsea oil or gas pipeline. The pipeline is typically coated to protect the pipeline against corrosion from seawater. In addition, the pipeline may be heat-insulated.

WO 2010/135772 shows retrofittable connectors mounted to the existing subsea pipeline at ROV-accessible locations. Prior to connection, coating is removed. The connectors may be releasably fastened in place using screws or permanently mounted in position using friction welding. One connector is described to be a bracelet clamp provided with one or more contact device(s) and at least one hot stab connector. One disadvantage with this bracelet clamp is that the arms of this clamp are connected to each other via a hinge. Hence, the clamp surrounds the entire target it is being connected to. It is described that the clamp is placed in position around the circumference of an end of the target. Hence, during a retrofitting operation, the pipeline itself must be disconnected and reconnected.

In general, it is cumbersome to provide an electrical connection between a subsea pipeline and electrical conductors. Hence, one object of the present invention is to provide a device and method for providing a reliable and long-lasting electrical connection between a subsea pipeline and an electrical conductor.

Another object of the invention is to provide a device and method for retrofitting a DEH system, where the above disadvantages are avoided. More specifically, the object of the invention is to avoid that the pipeline must be disconnected and then reconnected again in order to connect the clamp.

Another object of the invention is to provide a method for retrofitting a DEH system onto a subsea pipeline where a reliable and long-lasting electrical connection between the DEH cable and the pipeline is achieved.

Another object of the invention is to provide that the electrical connection can be performed by means of a ROV and ROV tools.

SUMMARY OF THE INVENTION

The present invention relates to a clamping device for providing an electrical connection between a subsea pipeline and an electrical conductor, where the clamping device comprises:

- a clamp element comprising a first leg having a first leg end and a second leg having a second leg end, where the legs are configured to be provided on respective sides of the pipeline;
- a releasable tensioning device connected to one of the legs;

characterized in that:

- the clamping device has a first state, in which the ends of the first and second legs are provided at a first distance away from each other;
- the clamping device has a second state, in which the tensioning device is tensioned, causing the ends of the first and second legs to be at a second distance away from each other, the second distance being larger than the first distance;
- the clamping device comprises a template hole provided in one of the legs;
- the clamping device comprises a connector member provided in the template hole, where the connector member is mechanically connected to the clamp element;
- the clamping device has a third state, in which the tensioning device is released, causing the connector member to be pressed towards the pipeline.

The connector member is electrically connected to a metal section of the pipeline and the electrical conductor is electrically connected to the clamping device. Preferably, the electrical conductor is electrically and mechanically connected to the clamp element, the connector member is electrically connected to the clamp element, and the clamp element is made of an electrically conducting material, thereby establishing electrical contact between the electrical conductor and the pipeline.

Alternatively, the electrical conductor is electrically connected directly to the connector member.

By pressing the clamping element outwardly with respect to the pipeline by means of the tensioning device, it is achieved that a tensioning force is applied to the clamp element. When releasing the tensioning device, it is achieved that the tensioning force of the clamp element is transferred to the connector member.

In the first state, the releasable tensioning device is released.

In one aspect, the connector member is electrically connected to the clamp element.

In one aspect, the connector member is provided in contact with a contact surface of the pipeline in the second state.

In one aspect, the tensioning device is tensioned towards the pipeline in the second state.

In one aspect, the ends of the first and second legs are at a third distance away from each other in the third state, the third distance being smaller than the second distance. Preferably, the third distance is larger than the first distance.

In one aspect, the template hole is adapted for a milling tool for milling a contact surface into the metal section of the pipeline.

In one aspect, the electrical conductor is a direct electrical heating conductor of a direct electrical heating system.

In one aspect, the clamping device further comprises an insert connected to the template opening, where the connector member is provided in a bore through the insert.

The present invention also relates to a system for providing an electrical connection between a subsea pipeline and an electrical conductor, where the system comprises:
 a clamping device according to the above;
 a tensioning tool for tensioning and releasing the releasable tensioning device.
 a milling tool for milling a contact surface into the pipeline through the template hole.

In one aspect, the tensioning tool is used for connecting the connector member to the clamping device.

In one aspect, the system further comprises a connector tool for connecting the connector member to the clamping device.

The present invention also relates to a method for providing an electrical connection between a subsea pipeline and an electrical conductor, where the method comprises the steps of:
 providing a clamping device at least partially around the pipeline;
 pressing the clamping device outwardly with respect to the pipeline by means of a tensioning device;
 milling a connector surface into a metal section of the pipeline through a template hole of the clamping device;
 providing a connector member in electrical contact with the connector surface through the template hole;
 connecting the connector member mechanically to the clamping device;
 connecting the connector member electrically to the electrical conductor;
 releasing the tensioning device. In one aspect, the step of connecting the connector member electrically to the electrical conductor comprises the steps of:
 connecting the connector member electrically to the clamping device;
 connecting the clamping device electrically to the electrical conductor.

In one aspect, the step of providing a clamping device at least partially around the pipeline comprises the step of:
 providing the clamping device with a clamp element with legs, each leg having a leg end having a first distance from each other;
 providing the legs of the clamp element on opposite sides of the pipeline.

In one aspect, step of connecting the connector member mechanically to the clamping device comprises to connect the connector member in a position in which it is in contact with the contact surface of the metal section of the pipeline.

In one aspect, the step of pressing the clamping device outwardly with respect to the pipeline by means of the tensioning device comprises the step of:
 increasing the distance between the legs ends to a second distance larger than the first distance.

In one aspect, the step of releasing the tensioning device comprises the step of:
 decreasing the distance between the legs ends to a third distance being smaller than the second distance. Preferably, the third distance is larger than the first distance.

In one aspect, the method further comprises the step of:
 milling a bore through a coating of the pipeline before milling of the connector surface.

In one aspect, the method comprises the step of:
 inserting an insert into the template opening after the milling of the connector surface;
 providing the connector member in electrical contact with the connector surface through the template hole and through a bore of the insert.

In one aspect, the step of milling the connector surface is performed after tensioning of the tensioning device.

In one aspect, the step of providing the connector member through the template hole is performed after tensioning of the tensioning device and after the milling of the connector surface.

All of the above method steps can be performed by means of a remotely operated vehicle.

DETAILED DESCRIPTION

Figure 2:
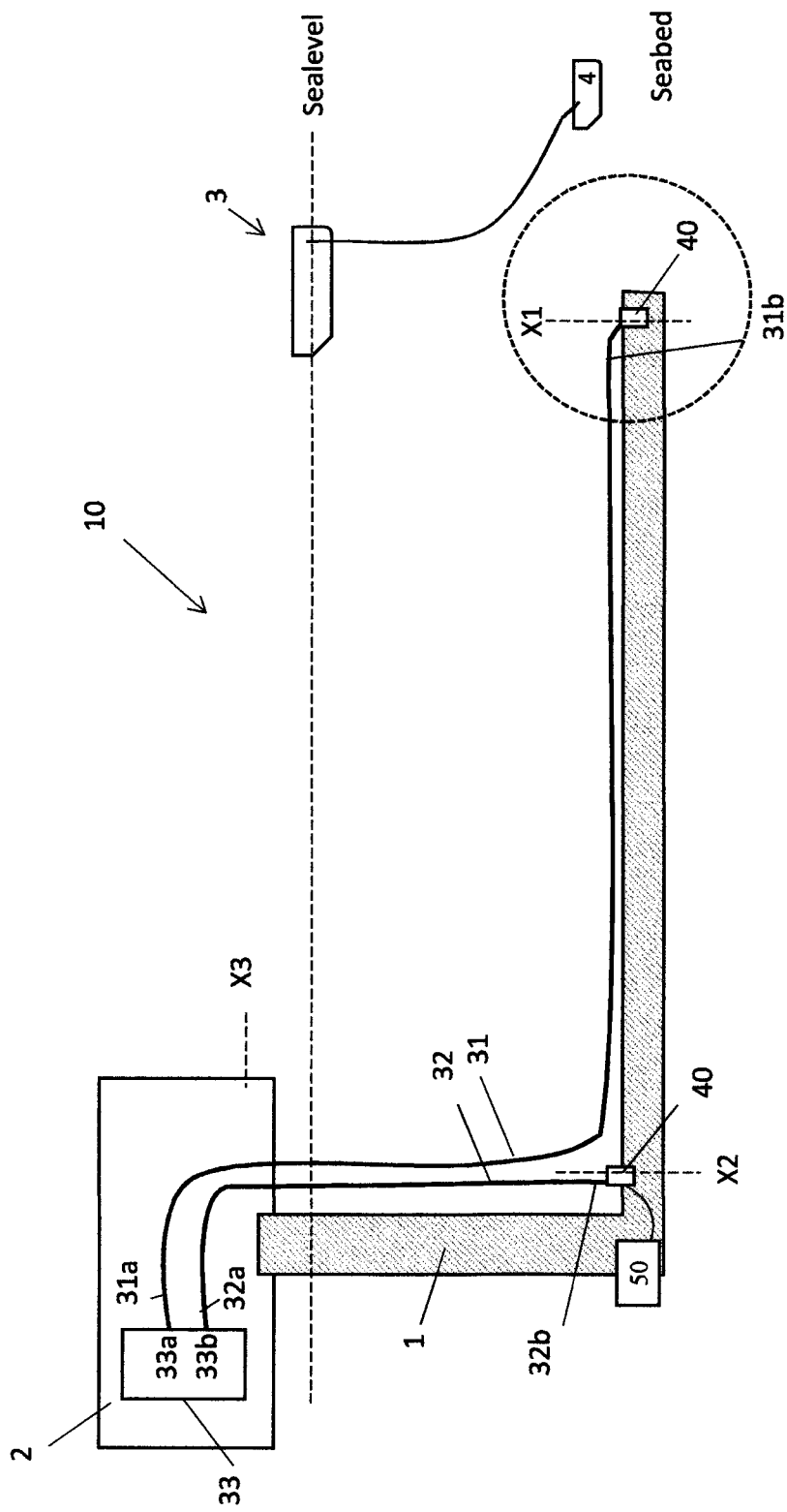

Embodiments of the invention will be described in detail below with reference to the enclosed drawings, where:
 FIG. 1 illustrates a simplified subsea pipeline;
 FIG. 2 illustrates a DEH system retrofit onto the subsea pipeline of FIG. 1;
 FIG. 3a illustrates a cross sectional view of the pipeline;
 FIG. 3b shows a first step of the method;
 FIG. 3c shows a second step of the method;
 FIG. 3d shows a third step of the method;
 FIG. 3e shows the enlarged view of area AA of FIG. 3d;
 FIG. 3f shows an enlarged view of the fourth step of the method;
 FIG. 3g shows a fifth step of the method;
 FIG. 3h illustrates an enlarged view of an additional step of the method;
 FIG. 4a-c illustrates alternative embodiments of the invention;
 FIG. 5a illustrates the tensioning of the releasable tensioning device of the embodiment in FIG. 4a by means of a ROV tool;
 FIG. 5b illustrates the milling of a contact surface through the template hole of the embodiment in FIG. 4a by means of a ROV tool;
 FIG. 5c illustrates a connector tool for connecting the connector member to the clamping device of the embodiment in FIG. 4a.

First, it is referred to FIG. 1, where it is shown a subsea pipeline 1 connected to a topside structure 2. The subsea pipeline 1 is an oil and/or gas transferring pipeline. The topside structure 2 can be an onshore structure or an offshore structure, such as a platform, an FPSO or oil and/or gas receiving structures.

A first location X1 indicates the distal end of the pipeline 1 with respect to the structure 2. A second location X2 indicates a proximal location of the pipeline 1 with respect to the structure 2.

In FIG. 2 it is shown that a direct electric heating (DEH) system 10 has been retrofitted on the pipeline 1 between the first and second locations X1 and X2. The DEH system 10 comprises a first DEH conductor 31 and a second DEH conductor 32. The DEH system 10 further comprises a power supply system 33 located at a third location X3, which in FIG. 2 is shown located topside, but can be located subsea as well.

In FIG. 2, it is shown that first ends 31a, 32a of the first and second DEH conductors 31, 32 are connected to a power supply system 33. It is also shown that a second end 31b of the first DEH conductor 31 is connected to the pipeline 1 at the first location X1, while the second end 32b of the second DEH conductor 32 is connected to the pipeline 1 at the second location X2;

In addition, the DEH system 10 comprises two clamping devices 40 which are used for connecting the second ends 31b, 32b of the first and second conductors 31, 32 to the pipeline 1. This will be described in detail below. It should be noted that it is possible to use one clamping device 40 to connect one of the second ends 31b, 32b to the pipeline 1, while another type of method/connector is used to connect the remaining one of the second ends 31b, 32b to the pipeline 1.

In FIG. 2 it is further shown a vessel 3 and a remotely operated vehicle (ROV) 4, which are performing the operation of connecting the first and second ends 31b, 32b to the pipeline by means of the ROV 4.

In addition, the DEH system 10 may comprise a so-called anode bank 50 with one or more anodes connected to one of or each of the clamping devices 40, for example by means of a jumper cable, and positioned on the pipeline or on seabed close to the pipeline. The anode bank will be used to control the current density escaping out/in into the sea.

It is now referred to FIG. 3a, where it is shown a cross section of the pipeline 1 with an inner metal pipe 1a and an outer coating layer 1b. In FIG. 3a, the coating layer 1b is relatively thick, indicating that the pipeline 1 is an insulated pipeline. Alternatively, the pipeline 1 may have a thin coating layer 1b for protecting the pipeline 1 against corrosion only. It should be noted that the present invention can be used with both of these types of pipelines. In FIG. 3a, the outer diameter of the pipeline 1 is indicated as diameter d0. In FIG. 3a, a half line HL is indicated, separating the pipeline 1 in an upper half section and a lower half section.

It is now referred to FIG. 3b, where the clamping device 40 has been lowered onto the pipeline 1. This will be the most practical approach, as the pipeline 1 will typically rest on the seabed, and only the part of the pipeline 1 above the seabed is accessible for the ROV 4. In FIG. 3a, the clamping device 40 has been lowered vertically onto the pipeline 1 as indicated by arrow A1. However, it should be noted that the clamping device 40 may be lowered onto the pipeline 1 in an inclined position as indicated by arrow A2.

The clamping device 40 comprises a substantially U-shaped clamp element 41 comprising a first leg 41a having a first leg end 41c and a second leg 41b having a second leg end 41d, where there the ends 41c, 41d are provided at a first distance d1 from each other. The distance d1 must be equal to, or a little larger than the outer diameter d0 of the pipeline 1.

Preferably, when the clamping device 40 has been lowered onto the pipeline 1, the ends 41c, 41d of the first and second legs 41a, 41b of the clamp element 41 are provided below the half line HL of the pipeline 1, as shown in FIG. 3a.

The clamping device 40 further comprises a releasable tensioning device 48 provided in one of the legs 41a, 41b. In FIG. 3b, there are two tensioning devices 48a, 48b, one provided for each leg 41a, 41b. The tensioning device 48 can be a threaded bolt provided in a threaded hole of the leg.

The clamping device 40 further comprises a template hole 42 provided in one of the legs 41a, 41b. In FIG. 3b, there are two template holes 42a, 42b, one for each leg 41a, 41b.

In FIG. 3g, it is shown that the clamping device 40 further comprises a connector member 44 provided in the template hole 42. In FIG. 3b, there are connector members 44, one in each of the two template holes 42a, 42b.

Details of the clamping device 40 will be apparent from the description below of the different steps of the method according to a first embodiment.

Initially, the first and second conductors 31, 32 have been installed between the location X3 of the power supply system 33 and the first and second locations X1, X2 respectively. The first ends 31a, 32a can be connected to the power supply system 33 before or after the installation of the clamping devices 40.

It is now referred to FIG. 3b again. Here, the releasable tensioning devices 48a, 48b are un-tensioned while lowering the clamping device 40 onto the pipeline 1. The clamping device 40 is now in its first state.

It is now referred to FIG. 3c. Here the clamping device 40 is pressed outwardly with respect to the pipeline 1 by tensioning of the tensioning devices 48a, 48b towards the outer surface of the pipeline 1. This operation is performed by the ROV 4, for example by rotating the tensioning bolts with respect to the legs 41a, 41b by means of a tensioning tool 62, as shown in FIG. 5a.

Preferably, the tensioning devices 48a, 48b has a contact surface towards the pipeline 1 which will not cause any damage to, or at least not cause any substantial damage to, the coating layer 1b of the pipeline 1.

By pressing the clamping device 40 outwardly with respect to the pipeline 1, the distance between the ends 41c, 41d of the legs 41a, 41b will increase to a second distance d2 larger than the first distance d1. The clamping device 40 is now in its second state.

It is now referred to FIG. 3d and FIG. 3e. Here it is shown that a bore BO has been milled through the coating layer 1b and that a contact surface CS has been milled into the inner metal pipe 1. Preferably, the contact surface CS is adapted to the connector member 44. Preferably, the contact surface CS is planar.

The above milling process is illustrated in FIG. 5b and is performed through the template openings 42a, 42b by means of a ROV operable milling tool 64.

Two different milling tools can be used for milling through the coating layer 1b and milling into the inner metal pipe 1a respectively.

It is now referred to FIG. 3f. Here, the connector member 44 has been inserted into the template opening 42a and is provided in electrical contact with the contact surface CS of the inner metal pipe 1a.

In the present embodiment, the connector member 44 is fixed to the template opening 42a for example by means of a threaded connection. It should be noted that while in the drawings, the diameter of the template opening 42a appear to be equal to the diameter of the milled bore BO, this is not necessarily the most desired solution, as threads of the template opening 42a may be damaged by the milling process. Hence, the diameter of the template opening 42a may in some embodiments be larger than the diameter of the milled bore BO. However, the connector member 44 may be fixed to other parts of the clamping device as well.

This operation is shown in FIG. 5c, where a connector tool 66 is used for connecting the connector member 44 to the clamping device 40. It should be noted that the connector tool 66 may be a tool different from the tensioning tool 62. Alternatively, the tensioning tool 62 may be used for both operations, i.e. to connect the connection member 44 to the clamping device and to tension and release the releasable tensioning device 48.

The above steps of milling the contact surface CS and subsequent mounting of the connector member 44 through the template opening 42 are performed while the clamping device 40 is in its second state, i.e. with a tensioned tensioning device 48. In this way it is achieved that the contact surface CS and the connector member 44 is oriented correctly with respect to each other, i.e. that they have the desired contact area.

It is now referred to FIG. 3g. Here, it is shown that the tensioning devices 48a, 48b have been released. The clamp element 41 will now try to revert to its initial shape. However, the connector members 44a, 44b will prevent this, as they are connected between the legs of the clamp element and the rigid inner metal pipe 1a. Hence, the clamp element 41 will exert a pressure on the connector members 44a, 44b towards the pipe 1a via its legs 41a, 41b. Consequently, a robust electrical contact between connector members 44a, 44b and the pipe 1a is achieved. The clamping device 40 is now in its third state.

In some cases, the step of releasing the tensioning devices 48a, 48b will cause that the distance between the legs 41a, 41b will decrease to a third distance d3 shown in FIG. 3b being smaller than the second distance d2. However, this third distance d3 will still be larger than the first distance d1 of FIG. 1.

In a final step, also shown in FIG. 3g, the second end 31b of the first conductor 31 is electrically and mechanically connected to the clamp element 41 at the first location X1. The above steps are then repeated for a further clamping device 40 at the second location X2, where the second end 32b of the second conductor 32b are connected to the further clamping device 40.

It should be noted that in the embodiment described above, the connector member 44 is electrically connected to the clamp element 41.

In an alternative embodiment shown in FIG. 4c, the connector members 44a, 44b mechanically, but not electrically, connected to the clamp element 41. Here, the second ends 31b, 32b (at the first and second locations X1, X2) are connected electrically directly to the connector members 44a, 44b.

It is now referred to FIG. 3b. Here, an insert 43 is inserted into the template opening 42 after the milling of the connector surface CS. Then, the connector member 44 is inserted into a bore of the insert 43 again and is provided in electrical contact with the connector surface CS as described above.

In the description above, the connector member 44 is mechanically connected to the clamping device 40 in a position in which it is in contact with the contact surface CS of the metal section of the pipeline 1. This is done when the clamping device 40 is in its second state.

In the description above, the clamping device 40 is described to have two legs 41a, 41b, two tensioning devices 48a, 48b, two template openings 42a, 42b and two connector members 44a, 44b. It is now referred to FIG. 4a and FIG. 4b, where it is shown alternative embodiments where the clamping device 40 comprises two legs 41a, 41b, but only one tensioning device 48, one template opening 42 and one connector member 44. In FIG. 4a, the template opening 42 (and hence the connector member 44) and the tensioning device 48 are provided on the same first leg 31a. In FIG. 4b, the template opening 42 (and hence the connector member 44) are provided on the second leg 41b while the tensioning device 48 is provided on the first leg 31a.

According to the embodiments above, it is achieved a direct mechanical and electrical connection between the conductors 31, 32 and the inner metal pipe 1a of the pipeline 1. This is preferred over a solution with a mechanical connection of the conductors 31, 32 to the coating layer 1b of the pipeline 1, as the coating layer 1b may deform mechanically or yield over time.

It should be noted that in the description above, the tensioning device 48 serves at least two purposes. The first purpose is to keep the clamping device 40 stationary with respect to the pipeline during the milling process. The second purpose is to provide the tensioning force needed to press the connector member 44 inwardly towards the pipeline 1. As described above, this second purpose is achieved by first pressing the legs 41a, 41b of the clamp element 41 away from each other during milling and subsequent connection of the connector member 44 to the clamp element 41 and then by releasing the tensioning device 48.

It should be noted that the examples and embodiments above is related to retrofitting a DEH system to a subsea pipeline. It should be noted that the present invention can be used to provide an electrical connection between a subsea pipeline 1 and any type of electrical conductor 31.

The invention claimed is:

1. Clamping device for providing an electrical connection between a subsea pipeline and an electrical conductor, where the clamping device comprises:
   a clamp element comprising a first leg having a first leg end and a second leg having a second leg end, where the legs are configured to be provided on respective sides of the pipeline;
   a releasable tensioning device connected to one of the legs;
   wherein:
   the clamping device has a first state, in which the ends of the first and second legs are provided at a first distance away from each other;
   the clamping device has a second state, in which the tensioning device is tensioned, causing the ends of the first and second legs to be at a second distance away from each other, the second distance being larger than the first distance;
   the clamping device comprises a template hole provided in one of the legs;
   the clamping device comprises a connector member provided in the template hole, where the connector member is mechanically connected to the clamp element;
   the clamping device has a third state, in which the tensioning device is released, causing the connector member to be pressed towards the pipeline.

2. Clamping device according to claim 1, where the connector member is electrically connected to the clamp element.

3. Clamping device according to claim 1, where the tensioning device is tensioned towards the pipeline in the second state.

4. Clamping device according to claim 1, where the ends of the first and second legs are at a third distance away from each other in the third state, the third distance being smaller than the second distance.

5. Clamping device according to claim 1, where the template hole is adapted for a milling tool for milling a contact surface into the metal section of the pipeline.

6. Clamping device according to claim 1, where the electrical conductor is a direct electrical heating conductor of a direct electrical heating system.

7. Clamping device according to claim 1, where the clamping device further comprises an insert connected to the template opening, where the connector member is provided in a bore through the insert.

8. System for providing an electrical connection between a subsea pipeline and an electrical conductor, where the system comprises:
- a clamping device according to claim 1;
- a tensioning tool for tensioning and releasing the releasable tensioning device;
- a milling tool for milling a contact surface into the pipeline through the template hole.

9. System according to claim 8, where the tensioning tool is used for connecting the connector member to the clamping device.

10. System according to claim 8, where the system further comprises a connector tool for connecting the connector member to the clamping device.

11. Method for providing an electrical connection between a subsea pipeline and an electrical conductor, where the method comprises the steps of:
- providing a clamping device at least partially around the pipeline;
- pressing the clamping device outwardly with respect to the pipeline by means of a tensioning device;
- milling a connector surface into a metal section of the pipeline through a template hole of the clamping device;
- providing a connector member in electrical contact with the connector surface through the template hole;
- connecting the connector member mechanically to the clamping device;
- connecting the connector member electrically to the electrical conductor;
- releasing the tensioning device.

12. Method according to claim 11, where the step of connecting the connector member electrically to the electrical conductor comprises the steps of:
- connecting the connector member electrically to the clamping device;
- connecting the clamping device electrically to the electrical conductor.

13. Method according to claim 11, where the step of providing a clamping device at least partially around the pipeline comprises the step of:
- providing the clamping device with a clamp element with legs, each leg having a leg end having a first distance from each other;
- providing the legs of the clamp element on opposite sides of the pipeline.

14. Method according to claim 13, where the step of pressing the clamping device outwardly with respect to the pipeline by means of the tensioning device comprises the step of:
- increasing the distance between the legs ends to a second distance larger than the first distance.

15. Method according to claim 13, where the step of releasing the tensioning device comprises the step of:
- decreasing the distance between the legs ends to a third distance being smaller than the second distance.

16. Method according to claim 11, where the method further comprises the step of:
- milling a bore through a coating of the pipeline before milling of the connector surface.

17. Method according to claim 11, where the method comprises the step of:
- inserting an insert into the template opening after the milling of the connector surface;
- providing the connector member in electrical contact with the connector surface through the template hole and through a bore of the insert.

18. Method according to claim 11, where the step of milling the connector surface is performed after tensioning of the tensioning device.

19. Method according to claim 18, where the step of providing the connector member through the template hole is performed after tensioning of the tensioning device and after the milling of the connector surface.

* * * * *